United States Patent Office 2,926,196
Patented Feb. 23, 1960

2,926,196

BIS(α-PHENYL-4-BROMOBENZYL) ETHER

David A. Gordon, Midland, Mich., assignor to The Dow Chemical Company, Midland, Mich., a corporation of Delaware No Drawing. Application February 3, 1958
Serial No. 712,643

1 Claim. (Cl. 260—611)

This invention is directed to bis(α-phenyl-4-bromobenzyl) ether corresponding to the formula

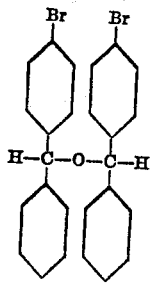

This new ether compound is a crystalline solid somewhat soluble in many organic solvents and of very low solubility in water. The compound is useful as a parasiticide and is adapted to be employed in dust and spray compositions for the control of many insect, bacterial and fungal pests.

The new compound may be prepared by heating 4-bromobenzhydrol corresponding to the formula

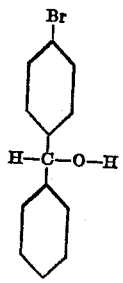

in the presence of a catalytic amount of a condensation catalyst whereby pairs of molecules of the 4-bromobenzhydrol condense with the formation of water of reaction. The condensation is carried out in the presence of an inert solvent such as ligroin, toluene, or methylcyclohexane. Good results are obtained when employing a condensation catalyst, such as a mineral acid or an arylsulfonic acid, in the amount of from 0.25 to 15 percent by weight of the employed 4-bromobenzhydrol. The condensation takes place smoothly at the temperature range of from 50° to 150° C.

In carrying out the reaction, the 4-bromobenzhydrol, solvent and a catalyst such as hydrochloric acid, sulfuric or phenylsulfonic acid are admixed and the resulting admixture heated with continuous stirring for a period of time at a temperature of 50° to 150° C. The heating may be carried out with the continuous distillation of the water of reaction together with some of the solvent, separation of the water and recycling of the solvent to the reaction zone. When operating under these conditions, approximately the entire theoretical amount of water of reaction, corresponding to the formation of the dimer, is obtained. Upon completion of the reaction, the bis-(α-phenyl-4-bromobenzyl) ether may be separated by cooling the reaction mixture, whereupon the desired product crystallizes and is removed by filtration. The product may be further purified by recrystallization from various organic solvents.

The following example illustrates the invention, but is not to be construed as limiting.

Example 1

4-bromobenzhydrol (0.88 mole; 332 grams) and 1.5 grams of p-toluenesulfonic acid were dispersed in 600 milliliters of methylcyclohexane and the resulting mixture heated at the boiling temperature (101° C.) for two hours. During the heating, water of reaction and some of the methylcyclohexane was continuously distilled from the reaction zone, the water (8 milliliters) separated, and the solvent recycled to the reaction zone. Following the period of heating, the reaction mixture was cooled to room temperature. During the cooling, a bis(α-phenyl-4-bromobenzyl) ether product precipitated in the reaction mixture as a white crystalline solid, and was separated by filtration. This product was recrystallized from petroleum ether and found to melt at 143°–143.5° C.

The new bis(α-phenyl-4-bromobenzyl) ether of this invention is useful as a parasiticide and may be employed for the control of many pests. For such use, the compound may be dispersed on an inert finely divided solid and employed as a dust. Also, such mixtures may be dispersed in water with the aid of a wetting agent and the resulting aqueous suspensions used as sprays. In other procedures, the compound may be employed in oils, in oil-in-water emulsions, or in water dispersions with or without the aid of dispersing or emulsifying agents. In representative operations, the application to wheat plants, promptly thereafter infested with wheat rust, of aqueous spray compositions containing 0.5 pound of bis(α-phenyl-4-bromo-benzyl) ether per hundred gallons of ultimate mixture gave substantially complete controls of wheat rust.

I claim:

Bis(α-phenyl-4-bromobenzyl) ether.

References Cited in the file of this patent

UNITED STATES PATENTS

| | | |
|---|---|---|
| 2,224,865 | Folkers | Dec. 17, 1940 |
| 2,366,203 | Livak | Jan. 2, 1945 |

OTHER REFERENCES

March et al.: Jour. Econ. Entomol., vol. 45 (1952) pg. 853.